United States Patent Office 3,120,511
Patented Feb. 4, 1964

3,120,511
PRODUCTION OF A MIXTURE OF SODIUM SALTS OF 5'-INOSINIC ACID AND 5'-GUANYLIC ACID
Kuniyoshi Tanaka, Toyonaka, Osaka, Einosuke Ohmura, Nishinomiya, Hyogo, Koichi Ogata, Minoo, Osaka, Yasushi Sanno, Osaka, Masahiko Yoneda, Suita, Osaka, and Ikuo Suhara, Nishinomiya, Hyogo, Japan, assignors to Takeda Chemical Industries, Ltd., Osaka, Japan
No Drawing. Filed Sept. 21, 1961, Ser. No. 139,610
14 Claims. (Cl. 260—211.5)

This invention relates to the production of a mixture of sodium salts of 5'-inosinic acid and 5'-guanylic acid. More concretely, this invention relates to a method for separating purine-nucleotides and pyrimidine-nucleotides by adsorption chromatography on activated charcoal from a mixture of 5'-nucleotides obtained by degradation of nucleic acid, then selectively deaminating 5'-adenylic acid which is present in the separated purine-nucleotides mixture to convert it into 5'-inosinic acid, whereby a mixture composed of 5'-inosinic acid and 5'-guanylic acid is obtained.

In accordance with the present invention, a fraction composed of purine-nucleotides, e.g. 5'-adenylic acid, 5'-guanylic acid and 5'-inosinic acid, can effectively be collected by separating pyrimidine nucleotides by means of adsorption chromatography on activated charcoal from a 5'-nucleotides mixture, which may contain various impurities, obtained by degradation of ribonucleic acid-containing material. In addition, the 5'-adenylic acid which is present in the purine-nucleotides fraction may selectively be deaminated, without being isolated itself, into 5'-inosinic acid through a treatment with an enzyme capable of deaminating 5'-adenylic acid to convert the amino group thereof into the hydroxyl group, i.e. 5'-adenylic acid deaminase, which is produced from certain microorganisms. Further, according to the present invention, a mixture of sodium salts of 5'-inosinic acid and 5'-guanylic acid can be directly obtained from the purine-nucleotides without isolating therefrom each of its components separately.

It is well known that 5'-inosinic acid can be employed as an agent for enhancing the flavor or deliciousness of foodstuffs, i.e. as a chemical condiment, and further it is also known that 5'-guanylic acid is very effective in such use.

It is, therefore, very desirable and advantageous to be able directly to produce both components in a mixed state, without separating the respective components from the purine-nucleotides.

5'-inosinic acid and 5'-guanylic acid, as well as 5'-adenylic acid, belong to the so-called "purine-nucleotides" having a purine skeleton as base component, and they are differentiated from the so-called "pyrimidine-nucleotides" having a pyrimidine skeleton as the base component, e.g. 5'-cytidylic acid and 5'-uridylic acid. It is also known that such pyrimidine-nucleotides are in general poorly adapted for use as a chemical condiment. However, the pyrimidine-nucleotides generally coexist with the purine-nucleotides as the constituents of nucleic acid, and therefore 5'-nucleotides of both types are obtained in a mixed form in the hydrolyzate of natural nucleic acid. It is, however, most desirable that a mixture composed of only 5'-inosinic acid and 5'-guanylic acid, both of which exhibit a strong effect when used as a chemical condiment, be prepared from the hydrolyzate by a simple process. On the other hand, although 5'-adenylic acid per se shows no activity in imparting or enhancing the flavor or deliciousness of foodstuffs, it can be converted into 5'-inosinic acid with the aid of 5'-adenylic acid deaminase which is present in e.g. certain microorganisms without affecting other purine-nucleotides, i.e. 5'-inosinic acid and 5'-guanylic acid. Therefore, it is rather desirable to obtain a whole mixture of purine-nucleotides from a hydrolyzate, containing purine- and pyrimidine-nucleotides, of nucleic acid than to obtain 5'-inosinic acid and 5'-guanylic acid respectively. More particularly, this invention offers a very convenient and easily practiced process for the large scale production of a new chemical condiment.

In the method of this invention, a mixture of 5'-nucleotides is employed as the starting material. The mixture is easily available as a hydrolyzate of nucleic acid. The necessary enzyme system is known to be present in the culture of a certain microorganism or in a snake venom or in bovine intestinal mucosa.

The chemical hydrolyzate of nucleic acid does not contain 5'-nucleotides but 3'-nucleotides and 2'-nucleotides; therefore it cannot be used as the starting material in this invention. In certain enzyme sources e.g. cultures of certain microorganisms, there is also contained 5'-adenylic acid deaminase, and therefore the hydrolyzate of nucleic acid with an enzyme system of such sources contains more or less 5'-inosinic acid, although it is not present as the constituent of natural nucleic acid. In certain cases, the hydrolyzate as above does not contain any 5'-adenylic acid but 5'-inosinic acid, and all the 5'-purine nucleotides present are composed only of 5'-inosinic acid and 5'-guanylic acid. When an enzyme system not containing 5'-adenylic acid deaminase is employed for hydrolyzing nucleic acid, the hydrolyzate, i.e. the starting material of this invention, does not contain 5'-inosinic acid but 5'-adenylic acid and 5'-guanylic acid. And when an enzyme system containing a small quantity of or weak 5'-adenylic acid deaminase is employed for the hydrolysis, the hydrolyzate contains 5'-adenylic acid, 5'-guanylic acid and 5'-inosinic acid as 5'-purine-nucleotides. In the latter two cases, the hydrolyzate may be used as it is for the starting material in the method of this invention, or the hydrolyzate may first be subjected to deamination to convert 5'-adenylic acid which is one of the components of the hydrolyzate into 5'-inosinic acid. The deamination may for example be carried out in such a manner that the hydrolyzate per se is subjected to a per se known diazotization process to convert the amino group thereof into the hydroxyl group or to the action of 5'-adenylic acid deaminase. 5'-adenylic acid deaminase can conveniently be obtained from a culture of certain microorganisms, and the deaminase is in most cases produced concomitantly with an enzyme capable of hydrolyzing nucleic acid into 5'-nucleotides. But it is unnecessary to isolate or to purify the deaminase and the deaminase may be used in mixture form in the enzyme system without any undesirable effect.

When the nucleotides mixture containing 5'-adenylic acid is employed as the starting material, the mixture of purine-nucleotides separated as the product of this invention contains 5'-adenylic acid as a component. The product may be subjected to the action of adenylic acid deaminase as mentioned above to convert the 5'-adenylic acid component of the product into 5'-inosinic acid, whereby the desired mixture of 5'-inosinic acid and 5'-guanylic acid can be produced.

The starting material of the present invention, the hydrolyzate of nucleic acid generally contains nucleotides, amino acids, proteins, polysaccharides, inorganic salts, etc. as impurities. These impurities, however, have no undesirable effect upon the method of this invention. In other words, there is no need to remove these impurities prior to the application of the method of this invention.

For obtaining the nucleotides mixture as the starting material for this invention, use is made of a hydrolyzate of nucleic acid or its partial hydrolyzate by means of an enzyme system, capable of hydrolyzing nucleic acid into 5'-nucleotides, of a microorganism which in some cases may also contain 5'-adenylic acid deaminase. Such an enzyme system may be used in the form of living microorganism per se, or as an extracted or purified enzyme system or the like. Microorganisms capable of producing such an enzyme system are distributed among the classes Schizomycetes, Ascomycetes, etc. More concretely, the enzyme system for the indicated purpose is found in the culture of microorganisms belonging to the order Fungi Imperfecti (e.g. genus Fusarium, genus Verticillium, genus Gliomastix, genus Helminthosporium), the order Eubacteriales (e.g. genus Bacillus), the order Actinomycetales (e.g. genus Streptomyces), the order Sphaeriales (e.g. genus Anixiella, genus Botryosphaeria, genus Chaetomidium, genus Glomerella, genus Neurospora, genus Ophiobolus, genus Ophiostoma, genus Sordaria, genus Tilachlidium), and the order Plectascales (e.g. Aspergillus), for instance. Particularly, some of the microorganisms belonging to the order Actinomycetales, order Fungi Imperfecti or order Plectascales, produce 5'-adenylic deaminase concomitantly with an enzyme system capable of hydrolyzing nucleic acid into 5'-nucleotides, and therefore use of the whole enzyme system of such microorganisms gives directly a 5'-nucleotides mixture containing 5'-inosinic acid.

On the other hand, the nucleic acid source may be animal or vegetable tissue itself or extract thereof. These materials contain nucleic acid or its partial hydrolyzate. In this connection, it is most convenient to use yeast or its extract with an aqueous solvent as the said material.

Hydrolysis of these nucleic acid sources may generally be effected by incubating such microorganisms as above in a medium containing the nucleic acid source or by the addition of the culture filtrate, cell suspension or extracted enzyme to the extract or suspension of the nucleic acid source in an aqueous solution. The extracted enzyme may be crude or pure. The hydrolysis may be carried out in an aqueous solvent of pH 5-9 at a temperature at which enzyme activity is neither inactivated nor destroyed, usually 30-50° C. The reaction time may be selected so as to give an optimum yield of 5'-nucleotides, usually 2 to 40 hours. If necessary, enzyme activator such as bivalent metal, e.g. magnesium, may be added to the reaction medium.

In certain cases, phosphatase which is an enzyme capable of hydrolyzing nucleotides into nucleoside is present in the enzyme system of the microorganism. In such a case, phosphatase inhibitor should be added to the reaction system to inhibit the degradation of desired 5'-nucleotides into nucleosides. The phosphatase inhibitor may be phosphates, arsenates, cyanates, amino acids (e.g. cystein and glutamine), ethylenediamine tetraacetic acid, metallic ion (e.g. $Zn^{++}$ and $Cu^{++}$), etc.

By the selection of reaction conditions, the ratio of each of the 5'-nucleotides in the product mixture can be controlled as desired, and therefore the reaction may be terminated when the contents of 5'-purine nucleotides reach a maximum by tracing the contents by e.g. ultraviolet absorption measurement.

The reaction mixture thus obtained is the starting material of this invention, and contains 5'-purine nucleotides (5'-adenylic acid, 5'-guanylic acid and 5'-inosinic acid, etc.) and 5'-pyrimidine nucleotides (5'-uridylic acid, 5'-cytidylic acid, etc.). This mixture is, in the method of this invention, subjected to adsorption chromatography on activated charcoal, whereby impurities such as enzymes, inorganic matters originating from enzyme liquor, protein-like substances, amino acids and saccharides are removed and at the same time 5'-pyrimidine nucleotides and 5'-purine nucleotides are perfectly separated.

Particle size and quantity to be used of activated charcoal and the relationship between diameter and height of the column to be packed with the activated charcoal are experimentally determined or calculated from the flow rate and separability. The quantity of activated charcoal required for dividing 5'-nucleotides mixture into 5'-purine nucleotides and 5'-pyrimidine nucleotides then may be a little smaller than for separately eluting 5'-uridylic acid, 5'-cytidylic acid, 5'-inosinic acid and 5'-guanylic acid, in this order. Moreover, the period required for effective chromatography becomes rather short, because a shorter length of column may be sufficient for the purpose.

5'-nucleotides adsorbed on a layer of activated charcoal is eluted with neutral or alkaline aqueous or organic solvent, and dilute aqueous ammonia is most suitably used as the elution solvent. During the elution, ultraviolet absorption of the effluent is continuously measured by spectrophotometer, and the kind and contents of 5'-nucleotides eluted are conveniently determined from the absorption coefficient and absorbance ratio of each fraction in ultraviolet absorption measurement. In accordance with this determination, fractions containing 5'-purine nucleotides mixture can easily be collected. In this case, 5'-pyrimidine nucleotides are first eluted because of their rather weak affinity on activated charcoal, then 5'-purine nucleotides are eluted en bloc. When the hydrolyzate of nucleic acid as the starting material contains no 5'-adenylic acid, the effluent contains 5'-inosinic acid and 5'-guanylic acid. On the other hand, when the starting material contains 5'-adenylic acid, the effluent contains also 5'-adenylic acid together with 5'-guanylic acid and sometimes 5'-inosinic acid is also present. In the latter case, the effluent containing 5'-adenylic acid is concentrated to an appropriate concentration and the pH thereof is suitably adjusted, then is subjected to the action of 5'-adenylic acid deaminase to convert 5'-adenylic acid into 5'-inosinic acid without affecting coexisting 5'-guanylic acid and 5'-inosinic acid. 5'-adenylic acid deaminase can be found in the enzyme system of a microorganism of e.g. genus Streptomyces such as *Streptomyces aureus*, or of genus Aspergillus such as *Aspergillus elegans, Aspergillus fischeri, Aspergillus quercinus* and *Aspergillus melleus*.

When, for obtaining the starting material, an enzyme system of the microorganism capable of producing 5'-adenylic acid deaminase concomitantly with an enzyme system capable of hydrolyzing nucleic acid into 5'-nucleotides is employed, the effluent contains chiefly 5'-inosinic acid and 5'-guanylic acid. But when it becomes necessary to convert the remaining 5'-adenylic acid into 5'-inosinic acid completely, the product may again be subjected to the action of 5'-adenylic acid deaminase. For the purpose, the enzyme system containing 5'-adenylic acid deaminase is allowed to react with the 5'-adenylic acid-containing effluent. The reaction conditions in this step are that the pH of the medium is 5 to 8.5, the reaction temperature is around 37° C., and reaction may be carried out for 2 to 50 hours. If the enzyme system to be used in this step is contaminated with phosphatase which hydrolyzes 5'-nucleotides into the corresponding nucleosides, there is a possibility that the resultant 5'-inosinic acid as well as 5'-guanylic acid may be hydrolyzed into inosine and guanosine, respectively. From the enzyme system, therefore, phosphatase may be removed by adsorption thereof on an adequate amount of dibasic sodium phosphate or may be inactivated by the addition of sodium fluoride or by a treatment in which the enzyme liquor is heated at 50 to 60° C. for 10 to 30 minutes. The above-mentioned side-reaction can, thus, be avoided.

For obtaining the reactant composed of 5'-inosinic acid and 5'-guanylic acid from the reaction mixture, the reaction mixture is passed through a tower packed with activated charcoal to adsorb the nucleotide. Then, 5'-inosinic acid and 5'-guanylic acid are concomitantly eluted with a dilute ammoniacal aqueous methanol which is the most preferably employable eluant in this step. The effluent thus obtained is concentrated, the ammonia being simultaneously removed, and the nucleotides are precipitated as their mixed barium salt. For the precipitation there is added e.g. barium acetate at about pH 8 to the effluent followed by the addition of e.g. methanol or ethanol as water-miscible organic solvent.

For converting this barium salt into sodium salt, dilute sulfuric acid is added to an aqueous suspension of the barium salt to remove barium sulfate as precipitate, followed by the neutralization with sodium hydroxide. Or, instead of the neutralization, the solution may be treated with the sodium form of a strongly acid sulfonic acid ion exchange resin (available in the market under the trade name of e.g. Amberlite IR–120 from Rohm & Haas Company, Philadelphia, Pa.), followed by the addition of e.g. methanol as water-miscible organic solvent. Or, double decomposition between the barium salt of the nucleotides and sodium sulfate by shaking in an aqueous suspension of the barium salt may be carried out, after which barium sulfate is filtered off and e.g. methanol or ethanol is added to the filtrate to separate mixed sodium salt of 5'-inosinic acid and 5'-guanylic acid.

If desired, the mixture of the respective sodium salts of 5'-inosinic acid and 5'-guanylic acid may be prepared from the eluate with dilute ammoniacal aqueous methanol from the activated charcoal without intermediately precipitating the mixture as its barium salt. Such a preparation may be effected by concentrating the eluate, adding two equivalents of sodium hydroxide relative to the nucleotides contained in the concentrate, concentrating the mixture, then adding methanol to the concentrate to precipitate the desired sodium salt of the mixture.

The sodium salt may be prepared as a mixture of disodium salts or as a mixture of mono-sodium salts of the nucleotides in accordance with the quality of sodium ion supplied.

The following examples set forth presently-preferred embodiments of the method of this invention, but they are not intended to limit or to restrict the scope of this invention. In the examples, all percentages are in weight percent except when otherwise specified.

*Example 1*

Six liters of a degradation liquor (which contains 3 grams of inosinic acid according to an enzymatic assay) of yeast ribonucleic acid with an enzyme liquor obtained by the cultivation of *Streptomyces aureus* is filtered in the presence of a filter aid, then the filtrate is adjusted to pH 1.5. The solution is passed through a column (4.3 centimeters in diameter, 43 centimeters in height) packed with 120 grams of activated charcoal (chromatographical grade) at a flow rate of 1 liter per hour. After washing well with water, the column is eluted with 1% aqueous ammonia at a rate of 110 milliliters per hour. Absorbance ratio of each fraction is successively measured by the ultraviolet absorption measurement, and it is found that both 5'-uridylic acid and 5'-cytidylic acid are contained in the initial 160 milliliters of the effluent. Further elution is continued with the same eluant as above to elute a fraction containing 5'-inosinic acid and 5'-guanylic acid in the following 16 liters of the effluent. The fraction containing 5'-inosinic acid and 5'-guanylic acid is concentrated to 160 milliliters under reduced pressure, followed by the addition of a small quantity of aqueous ammonia to adjust to pH 8.5. To the concentrate, 30 milliliters of 25% aqueous barium acetate solution and 100 milliliters of methanol are added in this order, then the mixture is stored in a refrigerator. The precipitate which separates is washed with a small quantity of methanol to obtain 15.2 grams of a mixture composed of respective barium salts of 5'-inosinic acid and 5'-guanylic acid.

To a suspension of this barium salt of mixed nucleotides in water, there is added a solution of 5 grams of sodium sulfate in 50 milliliters of water. After being agitated, the mixture is filtered to remove barium sulfate which separates. Then the filtrate is concentrated and thereafter methanol is added thereto to obtain 6.3 grams of a mixture composed of respective sodium salts of 5'-guanylic acid and 5'-inosinic acid.

*Example 2*

To 6 liters of a mixed 5'-nucleotides-containing liquor obtained by degradation of yeast ribonucleic acid by means of enzyme solution of *Streptomyces griseus* (which contains 3 grams of 5'-adenylic acid according to the results of enzymatic assay), there are added 40 milliliters of concentrated hydrochloric acid to adjust to pH 2. The solution is passed through a tower (4 centimeters in diameter, 45 centimeters in height) packed with 120 grams of activated charcoal (chromatographic grade) at a flow-rate of 1.2 liters per hour. After washing well with water, the activated charcoal layer is eluted with 1.5% aqueous ammonia at a rate of 120 milliliters per hour. The adsorbance ratio of each fraction is successively measured by ultraviolet absorption measurement, and it is found that the pyrimidine nucleotides contain 5'-uridylic acid and 5'-cytidylic acid in the initial 360 milliliters of the effluent. Then 5'-adenylic acid and 5'-guanylic acid are mixedly eluted in the following 3.5 liters of the effluent.

The latter effluent is concentrated under reduced pressure to 350 milliliters in which 2.85 grams of 5'-adenylic acid is found by an enzymatic assay.

On the other hand, sodium monohydrogen phosphate is added to a culture of *Streptomyces aureus* to make the concentration of the phosphate 1.0 millimole per liter. Forty-five milliliters of the filtrate of the mixture is added to the afore-obtained concentrate containing 5'-adenylic acid and 5'-guanylic acid, and the mixture is adjusted to pH 5 by the addition of acetic acid. The mixture is left standing at 37° C. for 30 hours to obtain a resultant mixture in which 5'-adenylic acid is not present but which contains 2.4 grams of 5'-inosinic acid.

The resultant solution is adjusted to pH 1.5, and is passed through a layer of 45 grams of activated charcoal. After washing with water, the layer is eluted with 2 liters of 20% methanol containing 0.5% ammonia. The effluent is concentrated under reduced pressure to 100 milliliters, and is adjusted to pH 8.5. To the mixture, there are successively added 20 milliliters of 30% aqueous barium acetate solution and 180 milliliters of methanol to separate 9.3 grams of a mixture composed of barium salts of 5'-inosinic acid and 5'-guanylic acid. To a suspension of the barium salts in 450 milliliters of water, there is added 21 milliliters of 10% aqueous sodium sulfate solution to separate barium sulfate.

After the barium sulfate is removed by filtration, the solution is concentrated to 45 milliliters. One hundred milliliters of methanol is added to the concentrate to separate sodium salt. The sodium salt is washed with methanol and ether successively, then is dried under reduced pressure at 20 millimeters-Hg for 30 minutes at 60° C. to obtain 4.5 grams of a mixture composed of respective sodium salts of 5'-inosinic acid and 5'-guanylic acid as colorless crystalline powder.

By paper partition chromatography and ultraviolet absorption measurement, it is determined that the product contains 5'-inosinic acid and 5'-guanylic acid in a ratio of 4.16:2.22.

*Example 3*

The suspension of the mixture of the respective barium salts of 5'-inosinic acid and 5'-guanylic acid obtained in the same manner as in Example 1 is shaken together with 30 cubic centimeters of the sodium form of strongly acid sulfonic acid cation exchange resin (commercially available under the trade name of Amberlite IR–120 from Rohm & Haas Company, Philadelphia, Pa.) to convert the barium salts into sodium salts and to bring the barium salts into solution. After filtering off the resin, the solution is concentrated under reduced pressure, followed by the addition of methanol to obtain 6.1 grams of the mix-

Example 4

The eluate with 1% aqueous ammonia from the activated charcoal obtained in the same manner as in Example 1 is concentrated under reduced pressure while simultaneously distilling off the ammonia. To the concentrate there is added two equivalents of aqueous sodium hydroxide solution relative to the nucleotides contained. The mixture is concentrated under reduced pressure, followed by the addition of methanol to obtain 6.8 grams of the objective mixture of respective sodium salts (of 5'-inosinic acid and 5'-guanylic acid).

Example 5

The suspension of the mixture of the respective barium salts of 5'-inosinic acid and 5'-guanylic acid obtained in the same manner as in Example 1 is shaken with 20 cubic centimeters of the sodium form of strongly acid sulfonic acid cation exchange resin (commercially available under the trade name of Amberlite IR-120 from Rohm & Haas Company, Philadelphia, Pa.) to convert the barium salts into sodium salts and to bring the barium salts into solution. After filtering off the resin, the solution is concentrated under reduced pressure, followed by the addition of methanol to obtain 4.6 grams of the mixture of respective sodium salts of 5'-inosinic acid and 5'-guanylic acid.

Example 6

The eluate with diluted ammoniacal methanol from the activated charcoal obtained in the same manner as in Example 2 is concentrated under reduced pressure to remove ammonia and methanol. To the residue there is added 2 equivalents of sodium hydroxide relative to the nucleotides contained in the concentrate. The mixture is further concentrated under reduced pressure followed by the addition of methanol to obtain 4.8 grams of the mixture of the respective sodium salts of 5'-inosinic acid and 5'-guanylic acid.

*Streptomyces griseus* and *Streptomyces aureus* employed as the enzyme source in the above examples have respectively been deposited at American Type Culture Collection under the accession numbers of 10137 and 13404. Other than these, there may be employed for the same purpose microorganisms such as:

* *Streptomyces albogriseolus* Benedict, Shotwell and Pridham NRRL B-1305,
*Streptomyces viridochromogenes* (Krainsky) Waksman and Henrici,
* *Streptomyces purpurescens* Lindenbeim IFO-3389, NRRL B-1454,
* *Streptomyces coelicolor* (Müller) Waksman and Henrici IFO-3807, ATCC-13405,
* *Helminthosporium sigmoideum* var. *irregulare* Cralley and Tullis IFO-5273, ATCC-13406,
* *Bacillus brevis* Migula emend. Ford ATCC-8185,
*Bacillus subtilis* Cohn emend. Prazmowski IFO-3032, ATCC-13407,
*Anixiella reticulispora* Saito and Minoura IFO-5483, ATCC-13828,
*+ *Aspergillus elegans* Gasperini IFO-4286, ATCC-13829,
+ *Aspergillus flavipes* (Bainier and Sartory) Thom and Church IFO-4052, ATCC-13830,
+ *Aspergillus fischeri* Nehmer IFO-5866, ATCC-13831,
+ *Aspergillus melleus* Yukawa IFO-4339, ATCC-13832,
+ *Aspergillus nidurans* (Eidam) Winter IFO-5713, ATTC-13833,
+ *Aspergillus quercinus* (Bainier) Thom and Church IFO-4363, ATCC-14307,
* *Botryosphaeria ribis chromogena* G. and D. IFO-4837, ATCC-13834,
* *Chaetomidium japonicum* Saito and Okazaki IFO-4451, ATCC-13835,
*+ *Glomerella cingulata* (Stonem.) Spauld. and V. Schr. IFO-5907, ATCC-13836,
* *Neurospora crassa* Chear and Dodge IFO-6067, ATCC-13837,
*Neurospora sitophila* Shear and Dodge IFO-6069, ATCC-13838,
* *Ophiobolus miyabeanus* Ito and Kuribayashi IFO-4870, ATCC-13839,
* *Ophiostoma ulmi* (Buisman) Nannf. IFO-6128, ATCC-13840,
* *Sordaria fimicola* (Rab.) Cesari and De Notaris IFO-4846, ATCC-13841,
* *Tilachlidium humicola* Oudemans IFO-5696, ATCC-13842.

In the microorganisms presented above, the numbers attached to the names of the species of microorganisms show the respective accession numbers of the strain used in Institute for Fermentation, Osaka, Japan (IFO), Northern Utilization Research Branch of U.S. Department of Agriculture, Peoria, Ill. (NRRL), or American Type Culture Collection, Washington, D.C. (ATCC).

In the list of microorganisms above, microorganisms marked with an asterisk (*) produce phosphodiesterase accompanying phosphomonoesterase therewith. Therefore, when these microorganisms are employed, phosphomonoesterase-inhibitor (e.g. sodium arsenate and sodium floride) may preferably be added when these procedures are employed.

Among the afore-listed microorganisms, those marked with a cross (+) produce 5'-adenylic acid deaminase concomitantly with the enzyme system capable of hydrolyzing nucleic acid into 5'-nucleotides. Accordingly, when these microorganisms are employed for the hydrolysis of nucleic acid, 5'-inosinic acid can be produced in the hydrolyzate together with 5'-guanylic acid etc. When the microorganisms without the cross mark (+) are employed, the hydrolyzate contains no 5'-inosinic acid but 5'-adenylic acid, and therefore the hydrolyzate may be required to be subjected to a reaction similar to that in Example 2 to obtain a mixture composed of 5'-inosinic acid and 5'-guanylic acid.

In the Examples 3 and 5, the strongly acid cation exchange resin employed is sulfonated polystyrene bead cation exchange resin and is characterized by a particle size of 0.45 to 0.60 millimeter, the approximate total exchange capacity of about 1.9 milliequivalent per milliliter of wet resin, and the cross linkage of containing 8 to 10 percent of cross-linking agent. Such a resin can be obtained, for example, through the processes described in "Ion Exchange Resin," second edition by Robert Kunin, published by John Wiley & Sons, Inc., New York, N.Y., pp. 82–85, 1958 and the literature cited therein as pertinent. Any other sulfonic acid cation exchange resin may, of course, be used instead of the resin actually described in the examples. For example, Dowex 50 (Dow Chemical Co., Midland, Mich.), Duolite C-3 (Chemical Process Co., Redwood City, Calif.), and Diaion SK #1 (Mitsubishi Chemical Industries, Limited, Tokyo, Japan) may all be used for the same purpose. These resins are all characterized by their properties resembling the aforementioned properties.

Having thus disclosed the invention, what is claimed is:
1. A method for preparing a mixture of sodium salts of 5'-inosinic acid and 5'-guanylic acid, which comprises subjecting a hydrolyzate of nucleic acid by means of a microorganism-derived enzyme system capable of hydrolyzing nucleic acid into 5'-nucleotides and capable of converting 5'-adenylic acid into 5'-inosinic acid, to chromatography on activated charcoal to collect an eluate containing 5'-purine nucleotides en bloc, precipitating a mixture of the respective barium salts of 5'-inosinic acid and 5'-guanylic acid, and converting the said barium salts into sodium salts.

2. A method for preparing a mixture of sodium salts of 5'-inosinic acid and 5'-guanylic acid, wich comprises subjecting a hydrolyzate of nucleic acid by means of a microorganism-derived enzyme system capable of hydrolyzing nucleic acid into 5'-nucleotides to a chromatography on activated charcoal to collect an eluate containing 5'-purine nucleotides en bloc, subjecting 5'-adenylic acid which is present in the said eluate to the action of a microorganism-derived enzyme system capable of converting 5'-adenylic acid into 5'-inosinic acid, subjecting thus produced hydrolyzate to an adsorption-elution process on activated charcoal to collect an eluate containing 5'-inosinic acid as well as 5'-guanylic acid, precipitating from the eluate a mixture of respective barium salts of 5'-inosinic acid and 5'-guanylic acid, and converting the barium salts into sodium salts.

3. The method claimed in claim 1, wherein the eluant to elute the eluate containing 5'-purine nucleotides en bloc is aqueous ammonia.

4. The method claimed in claim 2, wherein the eluant to elute the eluate containing 5'-purine nucletoides en bloc is aqueous ammonia.

5. The method of claimed in claim 1, wherein the precipitation of the barium salt is carried out by means of barium acetate.

6. The method claimed in claim 2, wherein the precipitation of the barium salt is carried out by means of barium acetate.

7. The method claimed in claim 1, wherein the conversion of the barium salt into sodium salt is carried out by means of sodium sulfate.

8. The method claimed in claim 2, wherein the conversion of the barium salt into sodium salt is carried out by means of sodium sulfate.

9. The method claimed in claim 1, wherein the conversion of the barium salt into sodium salt is carried out by means of the sodium form of a strongly acid sulfonic acid cation exchange resin.

10. The method claimed in claim 2, wherein the conversion of the barium salt into sodium salt is carried out by means of the sodium form of a strongly acid sulfonic acid cation exchange resin.

11. The method claimed in claim 2, wherein the enzyme system of microorganism capable of converting 5'-adenylic acid into 5'-inosinic acid is that produced from *Streptomyces aureus*.

12. The method of claimed in claim 2, wherein the eluant to elute the eluate containing 5'-inosinic acid as well as 5'-guanylic acid is ammoniacal dilute methanol.

13. A method for preparing a mixture of respective sodium salts of 5'-inosinic acid and 5'-guanylic acid, which comprises subjecting a hydrolyzate of nucleic acid by means of a microorganism-derived enzyme system capable of hydrolyzing nucleic acid into 5'-nucleotides and capable of converting 5'-adenylic acid into 5'-inosinic acid to chromatography on activated charcoal to collect an eluate containing 5'-purine nucleotides en bloc, adding to a concentrate of the eluate two equivalents of sodium hydroxide, and further adding methanol to the mixture to precipitate the afore-said mixture of sodium salts.

14. The method claimed in claim 13, wherein the eluant to elute the eluate containing 5'-purine nucleotides en bloc is aqueous ammonia.

References Cited in the file of this patent

Colowick et al.: "Methods in Enzymology," vol. III, Academic Press, Inc., N.Y. (1957), pp. 725 to 736, 757, 793 to 799, 873–876.